(12) United States Patent
Cazzato et al.

(10) Patent No.: US 6,489,001 B1
(45) Date of Patent: Dec. 3, 2002

(54) PROTECTIVE IMPACT-RESISTANT THERMAL INSULATION STRUCTURE

(75) Inventors: Anthony Cazzato, Torrance, CA (US); David Sherrill, Tejunga, CA (US)

(73) Assignee: Northrop Grumman Corp., Los Angeles, CA (US)

( * ) Notice: Subject to any disclaimer, the term of this patent is extended or adjusted under 35 U.S.C. 154(b) by 0 days.

(21) Appl. No.: 09/536,233

(22) Filed: Mar. 27, 2000

(51) Int. Cl.⁷ .............................. B32B 3/02; B32B 3/04; B32B 3/14
(52) U.S. Cl. .............................. 428/45; 428/44; 428/47; 428/49; 428/76; 428/121; 428/124; 428/126; 428/127; 428/128; 428/293.4; 428/920
(58) Field of Search .............................. 428/76, 49, 70, 428/74, 68, 45, 44, 47, 121, 920, 293.4, 312.2

(56) References Cited

U.S. PATENT DOCUMENTS

| | | | |
|---|---|---|---|
| 3,185,748 A | | 5/1965 | MacDonald et al. ........ 264/261 |
| 3,444,033 A | * | 5/1969 | King .............................. 428/49 |
| 4,719,151 A | | 1/1988 | Chyung et al. .............. 428/428 |
| 4,911,061 A | * | 3/1990 | Pivitt et al. ................. 89/36.02 |
| 5,198,282 A | * | 3/1993 | Baker et al. ................. 428/114 |
| 5,211,999 A | * | 5/1993 | Okada ........................... 428/34.5 |
| 5,214,004 A | | 5/1993 | Bansal ............................. 501/8 |
| 5,308,421 A | * | 5/1994 | Gonczy et al. ................ 156/89 |
| 5,407,504 A | * | 4/1995 | Ewart-Paine ............. 156/306.6 |
| H1434 H | * | 5/1995 | Cytron ....................... 89/36.02 |
| 5,443,917 A | * | 8/1995 | Tarry ........................... 428/545 |
| 5,489,074 A | | 2/1996 | Arnold et al. ............... 244/158 |
| 5,512,351 A | * | 4/1996 | Miyamichi et al. ......... 428/195 |
| 5,553,455 A | | 9/1996 | Craig et al. .................... 60/753 |
| 5,626,951 A | * | 5/1997 | Hogenson ................... 442/262 |
| 5,639,531 A | | 6/1997 | Chen et al. .................... 428/49 |
| 5,804,306 A | | 9/1998 | Sorenson et al. ........... 428/297 |

* cited by examiner

*Primary Examiner*—Michael Barr
*Assistant Examiner*—Elena Tsoy
(74) *Attorney, Agent, or Firm*—Stetina Brunda Garred & Brucker

(57) ABSTRACT

A protective structure for thermal insulation and impact resistance, and especially suited for bonded application to the exterior of aircraft including spacecraft to protect the craft from high temperatures generated by exhaust gases and by atmospheric re-entry. The structure includes either a single ceramic tile component with a cover component comprising a fiber reinforced ceramic matrix composite encasing the tile component, or a plurality of ceramic tile components with a like single cover component encasing the plurality of tile components. Utilizing the structures as an external aircraft surface imparts a super hard exterior that functions to significantly prohibit impact and erosion damage while not compromising the desirable thermal insulation properties inherent to tile.

18 Claims, 1 Drawing Sheet

PROTECTIVE IMPACT-RESISTANT THERMAL INSULATION STRUCTURE

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

This invention relates in general to protective cover structures, and in particular to a protective structure for both thermal insulation and impact resistance wherein thermally insulative tile is encased within an impact resistant fiber reinforced ceramic matrix composite material to thereby provide high-temperature protection inherent in tile along with impact-damage protection against high-speed particulate collisions.

BACKGROUND OF THE INVENTION

The use of ceramic tile as a protective external structure is employed in various aircraft including spacecraft where thermal insulation is required for high-temperature protection against the heat of engine exhaust and of heat generated due to atmospheric re-entry. A typical aircraft application includes the bonding of a plurality of laterally juxtaposed tiles, usually square in shape, onto the aircraft. As is evident, the tiles so bonded are completely exposed and thus subject to all external environmental factors. As a result, while such tiles are highly effective in providing thermal protection, because their physical properties include a relative softness, they relatively quickly degrade due to impact forces upon collision with environmental particulate. Such deterioration results, of course, in high maintenance and product costs because frequent replacement is required to maintain the operability of the aircraft.

Despite the drawbacks associated with ceramic tile usage, no other compositions function as efficiently in providing the thermal protection that the product imparts. In view of this quality, it is apparent that a protective structure embodying ceramic tile coupled with an impact protectorant for such tile would provide an optimum combination usable in high-temperature applications and especially in aircraft applications. Accordingly, a primary object of the present invention is to provide a thermally-insulative ceramic tile structure additionally resistant to impact degradation from striking environmental particulate.

Another object of the present invention is to provide a thermally-insulative ceramic tile structure wherein impact resistance is provided from a ceramic matrix composite encasing a ceramic tile.

Yet another object of the present invention is to provide a thermally-insulative ceramic tile structure wherein a plurality of ceramic tiles are encased within one ceramic matrix composite encasement to thereby permit enlarged single structures for application to an aircraft.

These and other objects of the present invention will become apparent throughout the description thereof which now follows.

SUMMARY OF THE INVENTION

The present invention is a protective structure for thermal insulation and impact resistance, and is especially suited for bonded application to the exterior of aircraft including spacecraft to protect the craft from high temperatures generated by exhaust gases and by atmospheric re-entry. The structure comprises either a single ceramic tile component with a cover component comprising a fiber reinforced ceramic matrix composite encasing the tile component, or a plurality of ceramic tile components with a single cover component comprising a fiber reinforced ceramic matrix composite encasing the plurality of tile components. As is apparent, the latter configuration encompassing a plurality of tile components with a single encasement provides greater efficiency for application to an aircraft, for example, since a plurality can be placed at once. Conversely, the encased single ceramic tile component provides placement flexibility with respect to spacing because of being a smaller structure thereby positionable in tighter constraints.

Utilizing the present structure as an external aircraft surface imparts a super hard exterior that functions to significantly prohibit impact and erosion damage while not compromising the desirable thermal insulation properties inherent to tile. Formation of the structure is accomplished by wrapping one or more ceramic tile components within a single cover component comprising a prepreg ceramic matrix composite to thereby produce a precursor of the protective structure. This precursor is then subjected to a curing process, herein defined as including pyrolysis, to thereby render the prepreg composite as a fired ceramic matrix composite encompassing the ceramic tile component(s). Conventional tile adhesives can be employed to bond the structure at desired sites of the aircraft to thereby accomplish thermal protection while simultaneously protecting against foreign object impact. These benefits result in a more rapid turnaround of aircraft accompanied by significantly lower maintenance and operating costs.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENTS

Figure 1:
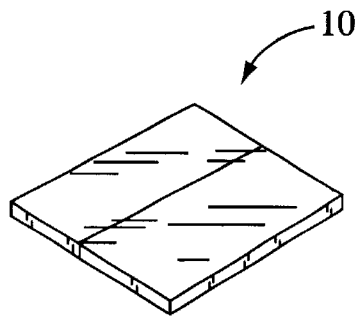
FIG. 1 is a perspective view of a first embodiment of a protective structure comprising a single tile component encased within a single ceramic matrix composite cover.
Figure 2:
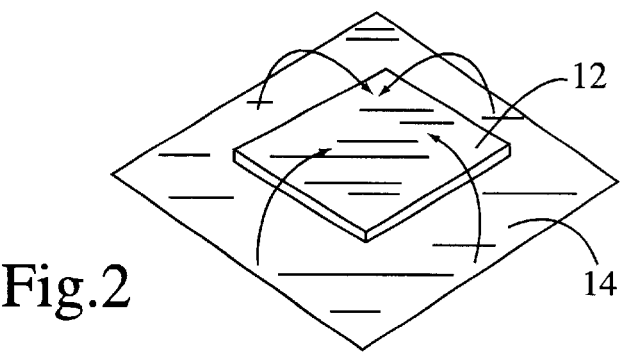
FIG. 2 is a perspective view illustrating the assembly of the protective structure of FIG. 1.

Referring first to FIGS. 1 and 2, an impact-resistant protective structure 10 for thermal insulation is shown. The structure 10 includes a single ceramic tile component 12 configured here as a square flat plate of one square foot. The tile component 12 is formed from a standard aluminosilicate composition as known in the art and as currently employed for thermal insulation in aircraft applications. FIG. 2 illustrates construction assembly of the protective structure 10. In particular, the tile component 12 is wrapped within a cover component 14 provided as a flexible sheet. The cover component 14 is a prepreg fiber reinforced non-cured ceramic matrix composite as non-limitedly exemplified as commercially available BLACKGLAS manufactured by Honeywell Corp., Santa Clara, Calif. The so-wrapped product then is subjected to a pyrolytic curing process whereby the ceramic matrix composite is cured which includes being fired (pyrolyzed), to thereby render the cover component 14 impact resistant while the tile component 12 provides its inherent thermal insulation.

As noted above, the protective structure 10 includes a single tile component 12 of one square foot, which is preferably the maximum size, and can easily be a smaller square, rectangular, or other configured shape, for a single tile component 12. While a protective structure 10 equal in size to a single tile component 12 may be advisable in providing versatility in certain spatial accommodations for product fit, many applications can, instead, benefit from larger-sized protective structures which, of course, can permit a more rapid coverage of a spatial area, while using less expensive, more readily available, small tile pieces.

Figure 3:
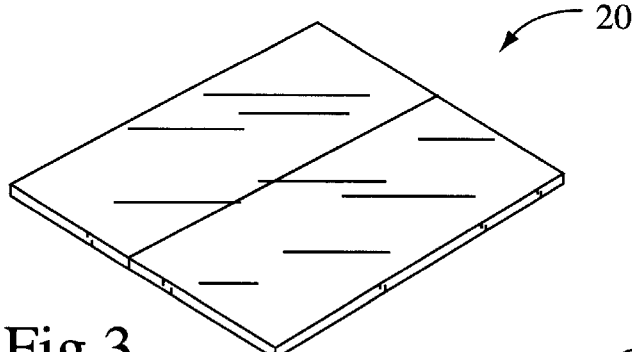
FIG. 3 is a perspective view of a second embodiment of a protective structure comprising four tile components encased within a single ceramic matrix composite cover.
Figure 4:
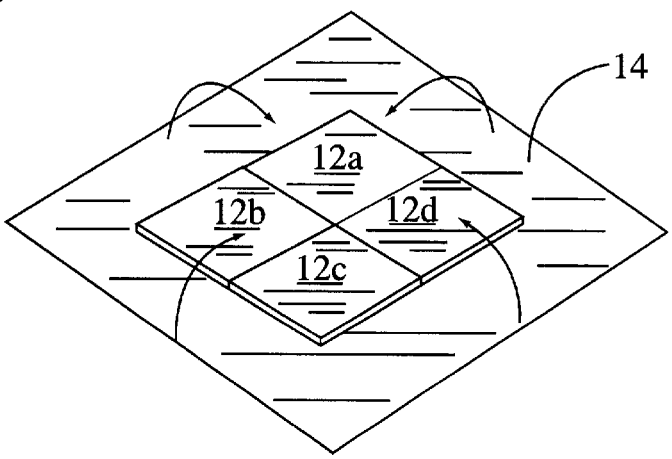
FIG. 4 is a perspective view illustrating the assembly of the protective structure of FIG. 3.

Accordingly, a second preferred embodiment illustrated in FIGS. 3 and 4 provides such size adaptability by encasing a plurality of tile components within a single cover component. Thus, as shown in FIGS. 3 and 4, a protective structure 20 includes four edge-abutting ceramic tile components 12a, 12b, 12c, 12d, each one square foot in size, wrapped in a single cover component 14 identical to the sheet described above in relation to the embodiment illustrated FIGS. 1 and 2. In particular, the four tile components 12a, 12b, 12c, 12d are situated in abutting relationship on the cover component 14 which then is folded over as shown to encase the four tile components 12a, 12b, 12c, 12d. In the same manner as described above with respect to the first embodiment, the so-wrapped product then is subjected to a pyrolytic curing process whereby the ceramic matrix composite is cured to thereby render the cover component 14 impact resistant while the tile components 12a, 12b, 12c, 12d provide inherent thermal insulation. Concurrently, a single protective structure 20 having a four square foot area is formed. Of course, the number, size and shape of tile components can be chosen as are beneficial to a structural need, with an area of coverage preferably being limited to no greater than about nine square feet so that logistic considerations can be adequately addressed.

Figure 5:
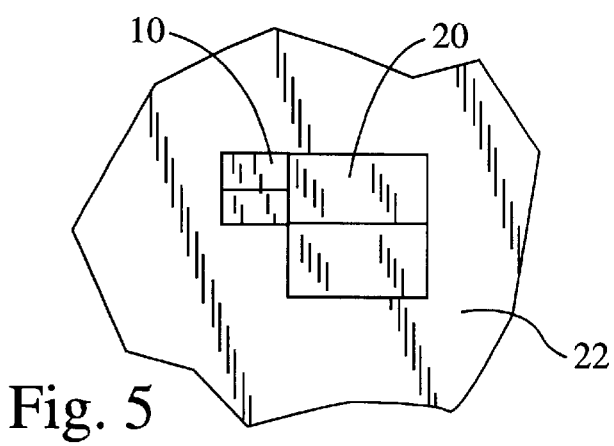
FIG. 5 is a side elevation view of a portion of an aircraft with a protective structure of each of FIG. 1 and FIG. 3 bonded thereto.

FIG. 5 illustrates operability of the protective structures 10, 20 in association with a substrate 22 such as an aircraft skin. In particular, the surface of the respective cover components 14 is adherable with conventional tile adhesive to thereby bond the structures 10, 20 to the substrate 22 in substantially the same manner as ceramic tile is directly bonded to such substrate 22. As is therefore evident, by providing structures 10, 20 of varying sizes as well as spatial configurations, personnel can relatively rapidly and efficiently bond impact-resistant thermal insulation to aircraft including spacecraft and thereby provide operational capabilities to such aircraft in otherwise untoward environmental conditions where object impact is a risk.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A protective structure for thermal insulation with impact resistance, the structure comprising:
    a) a single ceramic tile component; and
    b) a single cover component formed of a continuous fiber reinforced ceramic matrix composite prepreg material, the cover component being folded to wrap the ceramic tile component on all sides to create a seamless outer layer, the seamless outer layer increasing the structural integrity of the protective structure to thereby provide impact resistance.

2. A protective structure as claimed in claim 1 wherein the tile component is constructed of a material comprising an aluminosilicate compound.

3. A protective structure as claimed in claim 1 wherein the tile component is a substantially flat plate.

4. A protective structure as claimed in claim 3 wherein the tile component is substantially square.

5. A protective structure for thermal insulation with impact resistance, the structure comprising:
    a) a plurality of adjacent ceramic tile components having respective edges abutting all edges of next-adjacent tile components; and
    b) a single cover component formed of a continuous fiber reinforced ceramic matrix composite prepreg material, the cover component being folded to wrap the plurality of tile components on all sides to fix the plurality of tile components in their positions relative to each other and create a seamless outer layer, the seamless outer layer increasing the structural integrity of the protective structure to thereby provide impact resistance.

6. A protective structure as claimed in claim 5 wherein the tile components are constructed of a material comprising an aluminosilicate compound.

7. A protective structure as claimed in claim 5 wherein the respective tile components are substantially flat plates.

8. A protective structure as claimed in claim 7 wherein the respective tile components are substantially square.

9. A method of forming a protective structure exhibiting thermal insulation with impact resistance, the method comprising:
    a) wrapping a single ceramic tile component on all sides within a single folded cover component to produce a precursor of the protective structure, said cover component being formed of a continuous prepreg fiber reinforced ceramic matrix composite; and
    b) subjecting the precursor to a curing process to thereby render the prepreg composite as a cured fiber reinforced ceramic matrix composite encompassing the ceramic tile component on all sides to create a seamless outer layer, the seamless outer layer increasing the structural integrity of the protective structure to thereby provide impact resistance.

10. A method of forming a protective structure as claimed in claim 9 wherein the tile component is constructed of a material comprising an aluminosilicate compound.

11. A method of forming a protective structure as claimed in claim 9 wherein the tile component is a substantially flat plate.

12. A method of forming a protective structure as claimed in claim 11 wherein the tile component is substantially square.

13. A method of forming a protective structure exhibiting thermal insulation with impact resistance, the method comprising:
    a) wrapping a plurality of adjacent ceramic tile components having respective edges abutting all edges of next-adjacent tile components commonly within a single folded cover component encasing the tile components on all exposed sides to produce a precursor of the protective structure, said cover component being formed of a continuous fiber reinforced prepreg ceramic matrix composite; and b) subjecting the precursor to a curing process to thereby render the prepreg composite as a cured fiber reinforced ceramic matrix composite encompassing the ceramic tile component on all sides to create a seamless outer layer, the seamless outer layer increasing the structural integrity of the protective structure to thereby provide impact resistance.

14. A method of forming a protective structure as claimed in claim 13 wherein the tile components are constructed of a material comprising an aluminosilicate compound.

15. A method of forming a protective structure as claimed in claim 13 wherein the respective tile components are substantially flat plates.

16. A method of forming a protective structure as claimed in claim 15 wherein the respective tile components are substantially square.

17. A protective structure as claimed in claim 1 wherein the cover component is a sheet.

18. A protective structure as claimed in claim 5 wherein the cover component is a sheet.

* * * * *